(12) United States Patent
Wang et al.

(10) Patent No.: US 12,136,900 B2
(45) Date of Patent: Nov. 5, 2024

(54) METHOD, APPARATUS, AND SYSTEM FOR DETECTING SOLAR CELL OF PHOTOVOLTAIC PLANT

(71) Applicant: Huawei Digital Power Technologies Co., Ltd., Shenzhen (CN)

(72) Inventors: Jianqiang Wang, Shanghai (CN); Song Wan, Shanghai (CN); Yanzhong Zhang, Shanghai (CN); Yongbing Gao, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 169 days.

(21) Appl. No.: 17/669,724

(22) Filed: Feb. 11, 2022

(65) Prior Publication Data

US 2022/0166377 A1    May 26, 2022

Related U.S. Application Data

(63) Continuation of application No. PCT/CN2020/093606, filed on May 30, 2020.

(30) Foreign Application Priority Data

Aug. 12, 2019 (CN) .......................... 201910741156.8

(51) Int. Cl.
*H02S 50/15* (2014.01)
*H02S 40/32* (2014.01)
*H04N 5/33* (2023.01)

(52) U.S. Cl.
CPC .............. *H02S 50/15* (2014.12); *H02S 40/32* (2014.12); *H04N 5/33* (2013.01)

(58) Field of Classification Search
None
See application file for complete search history.

(56) References Cited

U.S. PATENT DOCUMENTS

2002/0131649 A1    9/2002    Yamaguchi
2015/0229269 A1*   8/2015    Rand ...................... H02S 50/15
                                                        324/761.01

(Continued)

FOREIGN PATENT DOCUMENTS

CN         1216108 A      5/1999
CN       203759474 U      8/2014

(Continued)

OTHER PUBLICATIONS

English machine translation of Nabe (DE-102012201421-A1) provided by the EPO website, All Pages, 2023. (Year: 2023).*

(Continued)

*Primary Examiner* — Daniel P Malley, Jr.
(74) *Attorney, Agent, or Firm* — Maier & Maier, PLLC

(57) ABSTRACT

A method and an apparatus for detecting a solar cell of a photovoltaic plant. The method includes: obtaining a first infrared image and a second infrared image, where the first infrared image includes infrared image information corresponding to an ambient infrared signal reflected by a to-be-detected solar cell operating in a short-circuit state, the second infrared image includes infrared image information corresponding to an infrared signal emitted by the to-be-detected solar cell operating in a first state and infrared image information corresponding to an ambient infrared signal reflected by the to-be-detected solar cell, and the first state is another state other than the short-circuit state; and detecting, based on the first infrared image and the second infrared image, whether the to-be-detected solar cell has a defect.

17 Claims, 5 Drawing Sheets

(56) References Cited

U.S. PATENT DOCUMENTS

2017/0019570 A1    1/2017   Meller et al.
2021/0135625 A1 *  5/2021   Deng .................... G06T 7/0002

FOREIGN PATENT DOCUMENTS

| CN | 104320077 | A |   | 1/2015  |        |          |
|----|-----------|---|---|---------|--------|----------|
| CN | 104899936 | A |   | 9/2015  |        |          |
| CN | 105915179 | A |   | 8/2016  |        |          |
| CN | 106230377 | A |   | 12/2016 |        |          |
| CN | 107192759 | A |   | 9/2017  |        |          |
| CN | 107481950 | A |   | 12/2017 |        |          |
| CN | 108445006 | A |   | 8/2018  |        |          |
| CN | 207720093 | U |   | 8/2018  |        |          |
| CN | 108647716 | A |   | 10/2018 |        |          |
| CN | 108680486 | A |   | 10/2018 |        |          |
| CN | 109187558 | A |   | 1/2019  |        |          |
| CN | 109787554 | A |   | 5/2019  |        |          |
| CN | 109884077 | A |   | 6/2019  |        |          |
| CN | 110535435 | A |   | 12/2019 |        |          |
| DE | 102012201421 | A1 | * | 8/2013 | ............ | H02S 50/10 |
| JP | H0837317 | A |   | 2/1996  |        |          |

OTHER PUBLICATIONS

Wang et al., "Research and Method of Defect Detection of Solar Panels Based on Infrared Imaging", Measurement and Control Technology, 2014, with English abstract, 4 pages.

* cited by examiner

METHOD, APPARATUS, AND SYSTEM FOR DETECTING SOLAR CELL OF PHOTOVOLTAIC PLANT

CROSS-REFERENCE TO RELATED APPLICATIONS

This application is a continuation of International Application No. PCT/CN2020/093606, filed on May 30, 2020, which claims priority to Chinese Patent Application No. 201910741156.8, filed on Aug. 12, 2019. The disclosures of the aforementioned applications are hereby incorporated by reference in their entireties.

TECHNICAL FIELD

The embodiments relate to the communications field, a method, an apparatus, and a system for detecting a solar cell of a photovoltaic plant.

BACKGROUND

A solar photovoltaic power generation technology is a low-carbon and eco-friendly energy technology. According to the technology, solar energy is converted into electrical energy by using a photovoltaic module. The photovoltaic module mainly includes a plurality of solar cells. Some solar cells in the photovoltaic module may have a defect due to collision, aging, or the like of the photovoltaic module. For this reason, at present, it is necessary to detect the defective solar cells of the photovoltaic module.

At present, the solar cells may be detected indoors. Indoors, an external excitation light source is used to emit point light, and a homogenizer is used to shape the point light into area light, to illuminate the entire photovoltaic module. The photovoltaic module converts illuminating light energy into electrical energy and emits an infrared signal under the drive of the electrical energy. The infrared signal is collected by using an infrared camera to obtain an infrared image. The infrared image includes an image of each solar cell in the photovoltaic module. Whether the solar cell has a defect is detected based on the image of the solar cell.

The conventional technology has at least the following disadvantages.

As described above, detection can be performed only indoors and using an external excitation light source. An area illuminated by the external excitation light source is limited. However, in a photovoltaic plant, generally, a large area is covered with photovoltaic modules, making it difficult to detect all the photovoltaic modules of the photovoltaic plant by using the foregoing method. During detection, a large amount of wiring reconstruction needs to be performed on a site to supply power to the external excitation light source for the external excitation light source to emit light, which increases costs of manual operation and maintenance.

SUMMARY

Embodiments provide a method, an apparatus, and a system for detecting a solar cell of a photovoltaic plant, to reduce difficulty and operation and maintenance costs of photovoltaic module detection. The solutions are as follows.

According to a first aspect, a method for detecting a solar cell of a photovoltaic plant may obtain a first infrared image and a second infrared image. The first infrared image includes infrared image information corresponding to an ambient infrared signal reflected by a to-be-detected solar cell operating in a short-circuit state, the second infrared image includes infrared image information corresponding to an infrared signal emitted by the to-be-detected solar cell operating in a first state and infrared image information corresponding to an ambient infrared signal reflected by the to-be-detected solar cell, and the first state is another state other than the short-circuit state. Whether the to-be-detected solar cell has a defect is detected based on the first infrared image and the second infrared image. Because the first infrared image includes the infrared image information corresponding to the ambient infrared signal reflected by the to-be-detected solar cell, and the second infrared image includes the infrared image information corresponding to the infrared signal emitted by the to-be-detected solar cell and the infrared image information corresponding to the ambient infrared signal reflected by the to-be-detected solar cell, when a sunlight source is used, the first infrared image and the second infrared image are obtained, and whether the to-be-detected solar cell has a defect may be detected based on the first infrared image and the second infrared image. In this way, it is unnecessary to use an artificial light source to detect a photovoltaic module indoors, making it unnecessary to move the photovoltaic module indoors and perform on-site wiring reconstruction to supply power to the artificial light source, thereby reducing difficulty and operation and maintenance costs of photovoltaic module detection, and facilitating comprehensive detection on the photovoltaic plant.

In a possible implementation, the infrared image information that is included in the second infrared image and that corresponds to the ambient infrared signal is removed based on the first infrared image, to obtain a third infrared image. Whether the to-be-detected solar cell has a defect is detected based on the third infrared image and a defect library. The defect library includes at least one defect and at least one sample image corresponding to each defect. Because the first infrared image includes the infrared image information corresponding to the ambient infrared signal, the second infrared image includes the infrared image information corresponding to the ambient infrared signal and the infrared image information corresponding to the infrared signal emitted by the to-be-detected solar cell, and the infrared image information that is included in the second infrared image and that corresponds to the ambient infrared signal is removed based on the first infrared image, so that the third infrared image in which ambient noise is eliminated is obtained, whether the to-be-detected solar cell has a defect can be successfully detected by using the third infrared image. In this way, a defect of a solar cell can be successfully detected by using a sunlight source. When the sunlight source is used, it is unnecessary to perform on-site wiring reconstruction and move a photovoltaic module indoors, thereby reducing difficulty and operation and maintenance costs of detection.

In another possible implementation, the to-be-detected solar cell is controlled to operate in the short-circuit state and the first state separately. In this way, the to-be-detected solar cell does not emit an infrared signal when operating in the short-circuit state, so that the first infrared image of the to-be-detected solar cell may be obtained when the to-be-detected solar cell operates in the short-circuit state. The to-be-detected solar cell emits an infrared signal when operating in the first state, so that the second infrared image may be obtained when the to-be-detected solar cell operates in the first state.

In another possible implementation, the defect library further includes a first state corresponding to a target defect, and the target defect is a partial defect in the defect library. The to-be-detected solar cell is controlled to operate in the first state corresponding to the target defect, so that whether the to-be-detected solar cell has the target defect is detected based on the first infrared image and the second infrared image. Higher brightness information of pixels included in a second infrared image indicates that an infrared image of the to-be-detected solar cell in the second infrared image is clearer, and accuracy of detecting the target defect may be higher. Brightness information of pixels in the second infrared image in the first state corresponding to the target defect meets brightness information required for detecting the target defect. Therefore, the accuracy of detecting the target defect may be improved by using the second infrared image in the first state corresponding to the target defect.

In another possible implementation, positive and negative output ends of a photovoltaic module on which the to-be-detected solar cell is located are connected to an inverter. In the method, a control command may be sent to the inverter. The control command carries a first instruction, and the first instruction is used to instruct the inverter to implement a short circuit between the positive output end and the negative output end of the photovoltaic module, so that the to-be-detected solar cell operates in the short-circuit state.

In another possible implementation, the first state includes an open-circuit state. In the method, a control command may be sent to the inverter. The control command carries a second instruction, and the second instruction is used to instruct the inverter to disconnect from the positive output end and the negative output end of the photovoltaic module, so that the to-be-detected solar cell operates in the open-circuit state.

In another possible implementation, the first state includes an output state. In the method, a control command may be sent to the inverter. The control command carries a target output power, and the target output power exceeds a preset threshold, so that the inverter controls an output power of the photovoltaic module to be equal to the target output power, so that the to-be-detected solar cell operates in the output state.

In a possible implementation, a quantity of solar cells corresponding to each defect and a quantity of normal solar cells in the photovoltaic module are counted, and a health index of the photovoltaic module is obtained based on the quantity of solar cells corresponding to each defect, a weight corresponding to each defect, the quantity of normal solar cells, a weight corresponding to the normal solar cell, and a total quantity of solar cells in the photovoltaic module. The health index of the photovoltaic module is obtained, so that maintenance personnel may make a processing decision on the photovoltaic module based on the health index, for example, determine whether to replace or repair the photovoltaic module.

In another possible implementation, when an illumination intensity of sunlight exceeds a preset intensity threshold, the to-be-detected solar cell is controlled to operate in the short-circuit state and the first state separately. A higher illumination intensity of sunlight indicates that a strength of an infrared signal emitted by the solar cell is higher, making it easier to detect a defect of the solar cell. Therefore, when the illumination intensity of the sunlight exceeds the preset intensity threshold, a detection operation is performed on the solar cell, so that detection accuracy can be improved.

In another possible implementation, a time difference between a start time of the short-circuit state and a start time of the first state does not exceed a preset time threshold. In this way, it is ensured that a strength of the ambient infrared signal in the first infrared image is basically the same as a strength of the ambient infrared signal in the second infrared image, so that detection accuracy can be improved.

According to a second aspect, an apparatus for detecting a solar cell of a photovoltaic plant may be configured to perform the method in any one of the first aspect or the possible implementations of the first aspect. The apparatus includes units configured to perform the method in the first aspect or any possible implementation of the first aspect.

According to a third aspect, an embodiment may provide an apparatus for detecting a solar cell of a photovoltaic plant. The apparatus includes at least one processor, at least one memory, and at least one transceiver. The at least one processor is connected to the at least one memory and the at least one transceiver through a bus. The least one memory stores one or more programs, the one or more programs are configured to be executed by the at least one processor, and the one or more programs include instructions used to perform the method according to any one of the first aspect or the possible implementations of the first aspect.

According to a fourth aspect, an embodiment may provide a computer-readable storage medium. The computer-readable storage medium stores instructions. When the instructions are run on a computer, the computer is enabled to perform the method in the first aspect or any possible implementation of the first aspect.

According to a fifth aspect, an embodiment may provide a computer program product including instructions. When the computer program product runs on a computer, the computer is enabled to perform the method in the first aspect or any possible implementations of the first aspect.

According to a sixth aspect, an embodiment may provide a system for detecting a solar cell of a photovoltaic plant. The system includes: a control device, an inverter, and an infrared signal collection terminal. The inverter is connected to a to-be-detected solar cell. The control device obtains a first infrared image and a second infrared image by using the inverter and the infrared signal collection terminal. The first infrared image includes infrared image information corresponding to an ambient infrared signal reflected by the to-be-detected solar cell operating in a short-circuit state, the second infrared image includes infrared image information corresponding to an infrared signal emitted by the to-be-detected solar cell operating in a first state and infrared image information corresponding to an ambient infrared signal reflected by the to-be-detected solar cell, and the first state is another state other than the short-circuit state. The control device detects, based on the first infrared image and the second infrared image, whether the to-be-detected solar cell has a defect. Because the first infrared image includes the infrared image information corresponding to the ambient infrared signal reflected by the to-be-detected solar cell, and the second infrared image includes the infrared image information corresponding to the infrared signal emitted by the to-be-detected solar cell and the infrared image information corresponding to the ambient infrared signal reflected by the to-be-detected solar cell, when a sunlight source is used, the first infrared image and the second infrared image are obtained, and whether the to-be-detected solar cell has a defect may be detected based on the first infrared image and the second infrared image. In this way, it is unnecessary to use an artificial light source to detect a photovoltaic module indoors, thereby reducing difficulty and operation and maintenance costs of photovoltaic module detection.

DETAILED DESCRIPTION OF THE EMBODIMENTS

The following describes in detail the embodiments with reference to accompanying drawings.

Figure 1:
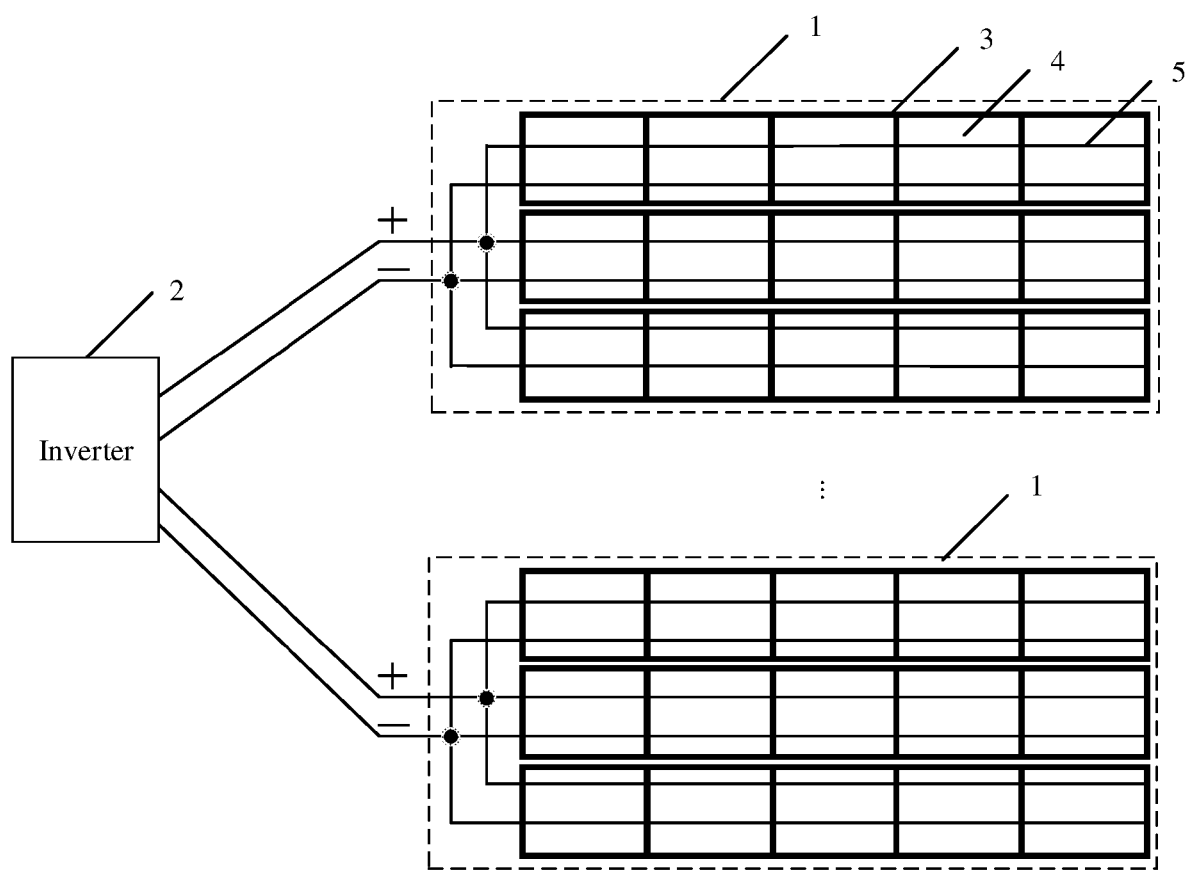
FIG. 1 is a schematic diagram of a structure of a photovoltaic plant according to an embodiment.

Referring to FIG. 1, a photovoltaic plant includes at least one photovoltaic module 1, positive and negative output ends of each photovoltaic module 1 are connected to an inverter 2, and each photovoltaic module 1 is connected to a power grid by using the inverter 2.

The photovoltaic module 1 includes at least one photovoltaic string 3. In other words, the photovoltaic module 1 may include one photovoltaic string 3, or the photovoltaic module 1 may include a plurality of photovoltaic strings 3. When the photovoltaic module 1 includes a plurality of photovoltaic strings 3, the plurality of photovoltaic strings 3 may be located parallel to each other in the photovoltaic module 1.

Each photovoltaic string 3 includes a plurality of solar cells 4, and the plurality of solar cells 4 is connected in series by using two busbars 5. One of the two busbars 5 is connected to the positive output end of the photovoltaic module 1 and a positive output end of each solar cell 4, and the other busbar 5 is connected to the negative output end of the photovoltaic module 1 and a negative output end of each solar cell 4.

Each solar cell 4 in the photovoltaic module 1 generates electrical energy under light illumination and transmits the generated electrical energy to the positive and negative output ends of the photovoltaic module 1 by using the busbars 5 connected to the solar cell. The positive and negative output ends of the photovoltaic module 1 input the electrical energy generated by each solar cell 3 in the photovoltaic module 1 to the inverter 2, and the inverter 2 inputs the electrical energy to the power grid.

The inverter 2 may control an output power of the photovoltaic module 1 and may control the output power of the photovoltaic module 1 to change from 0 to a maximum output power of the photovoltaic module 1.

The inverter 2 may control the solar cell 4 in the photovoltaic module 1 to operate in different operation states. The operation state includes at least one of an open-circuit state, a short-circuit state, or an output state. That is, the inverter 1 may control the solar cell 4 in the photovoltaic module 1 to operate in the open-circuit state, the short-circuit state, or the output state.

When the solar cell 4 in the photovoltaic module 1 operates in the open-circuit state or the short-circuit state, the output power of the photovoltaic module 1 does not exceed a preset threshold. Generally, when the solar cell 4 in the photovoltaic module 1 operates in the open-circuit state or the short-circuit state, the output power of the photovoltaic module 1 is 0. Sometimes, the output power of the photovoltaic module 1 may be greater than 0, but the output power is very small, and does not exceed the preset threshold. When the solar cell 4 in the photovoltaic module 1 operates in the output state, the output power of the photovoltaic module 1 exceeds the preset threshold.

The inverter 1 may disconnect from the positive and negative output ends of the photovoltaic module 1, so that the solar cell 4 in the photovoltaic module 1 operates in the open-circuit state. When the solar cell 4 in the photovoltaic module 1 operates in the open-circuit state, the positive output end and the negative output end of the photovoltaic module 1 are also disconnected, there is a maximum output voltage between the positive output end and the negative output end of the photovoltaic module 1, and an output current of the photovoltaic module 1 does not exceed a preset current threshold. Generally, the output current of the photovoltaic module 1 is 0. Sometimes, the output current of the photovoltaic module 1 may be greater than 0, but the output current is relatively small, and does not exceed the preset current threshold.

The inverter 1 implements a short-circuit between the positive output end and the negative output end of the photovoltaic module 1, so that the solar cell 4 in the photovoltaic module 1 operates in the short-circuit state. When the solar cell 4 in the photovoltaic module 1 operates in the short-circuit state, an output voltage between the positive output end and the negative output end of the photovoltaic module 1 does not exceed a preset voltage threshold, and the photovoltaic module 1 has a maximum output current. Generally, the output voltage between the positive output end and the negative output end of the photovoltaic module 1 is 0. Sometimes, the output voltage between the positive output end and the negative output end of the photovoltaic module 1 may be greater than 0, but the output voltage is relatively small, and does not exceed the preset voltage threshold.

The inverter 1 may control the output power of the photovoltaic module 1 to be greater than the preset threshold, to control the photovoltaic module 1 to operate in the output state.

The output power of the photovoltaic module 1 is equal to a product of the output current and the output voltage of the photovoltaic module 1. When the solar cell 4 in the photovoltaic module 1 operates in the open-circuit state, because the output current of the photovoltaic module 1 does not exceed the preset current threshold, the output power of the photovoltaic module 1 does not exceed the preset threshold. When the solar cell 4 in the photovoltaic module 1 operates in the short-circuit state, because the output voltage of the photovoltaic module 1 does not exceed the preset voltage threshold, the output power of the photovoltaic module 1 does not exceed the preset threshold.

When the output voltage between the positive and negative output ends of the photovoltaic module 1 is greater than the preset voltage threshold, the solar cell 4 included in the photovoltaic module 1 generates and emits an infrared signal. A higher output voltage between the positive and negative output ends of the photovoltaic module 1 indicates a stronger infrared signal generated by the solar cell 4 included in the photovoltaic module 1.

In this way, when the solar cell 4 in the photovoltaic module 1 operates in the short-circuit state, the solar cell 4 in the photovoltaic module 1 does not emit an infrared signal. When the solar cell 4 in the photovoltaic module 1 operates in the open-circuit state, the solar cell 4 in the photovoltaic module 1 generates a strongest infrared signal. When the photovoltaic module 1 operates in the output state, the solar cell 4 in the photovoltaic module 1 generates a second strongest infrared signal.

Optionally, the inverter 2 may be a photovoltaic string inverter, a centralized inverter, or a distributed inverter. The photovoltaic plant may be a large-scale commercial ground photovoltaic plant, a rooftop distributed photovoltaic plant, an agricultural-light/fishing-light complementary plant, a floating plant, or the like.

In addition, it should be noted that during long-term use of the photovoltaic module 1, some solar cells 4 in the photovoltaic module 1 may have a defect. The defect may be a black spot, a black core, a broken busbar, a hidden crack, a fragment, or the like.

The black spot means that there is an irregular black spot on a surface of the solar cell 4 or a color of the entire solar cell is darker than that of another solar cell. The black core means that there is a round black block in the center of the solar cell 4. The broken busbar means poor contact between the solar cell 4 and a busbar. The hidden crack means that there is a slight crack in the solar cell 4. The fragment means that the solar cell 4 is fragmented.

When a solar cell 4 has a defect, the solar cell 4 needs to be detected. The defective solar cell 4 in the photovoltaic module 1 may be detected, so that operation and maintenance personnel of the photovoltaic plant may determine the health of the photovoltaic module 1 based on the detected solar cell 4. The photovoltaic plant may be detected comprehensively, that is, each solar cell in each photovoltaic module 1 in the photovoltaic plant is detected, to detect each defective solar cell in the photovoltaic plant, so that the operation and maintenance personnel may determine health of the photovoltaic plant based on each detected solar cell 4.

For a process of detecting a solar cell 4, refer to any subsequent embodiment. Details are not described herein.

Figure 2:
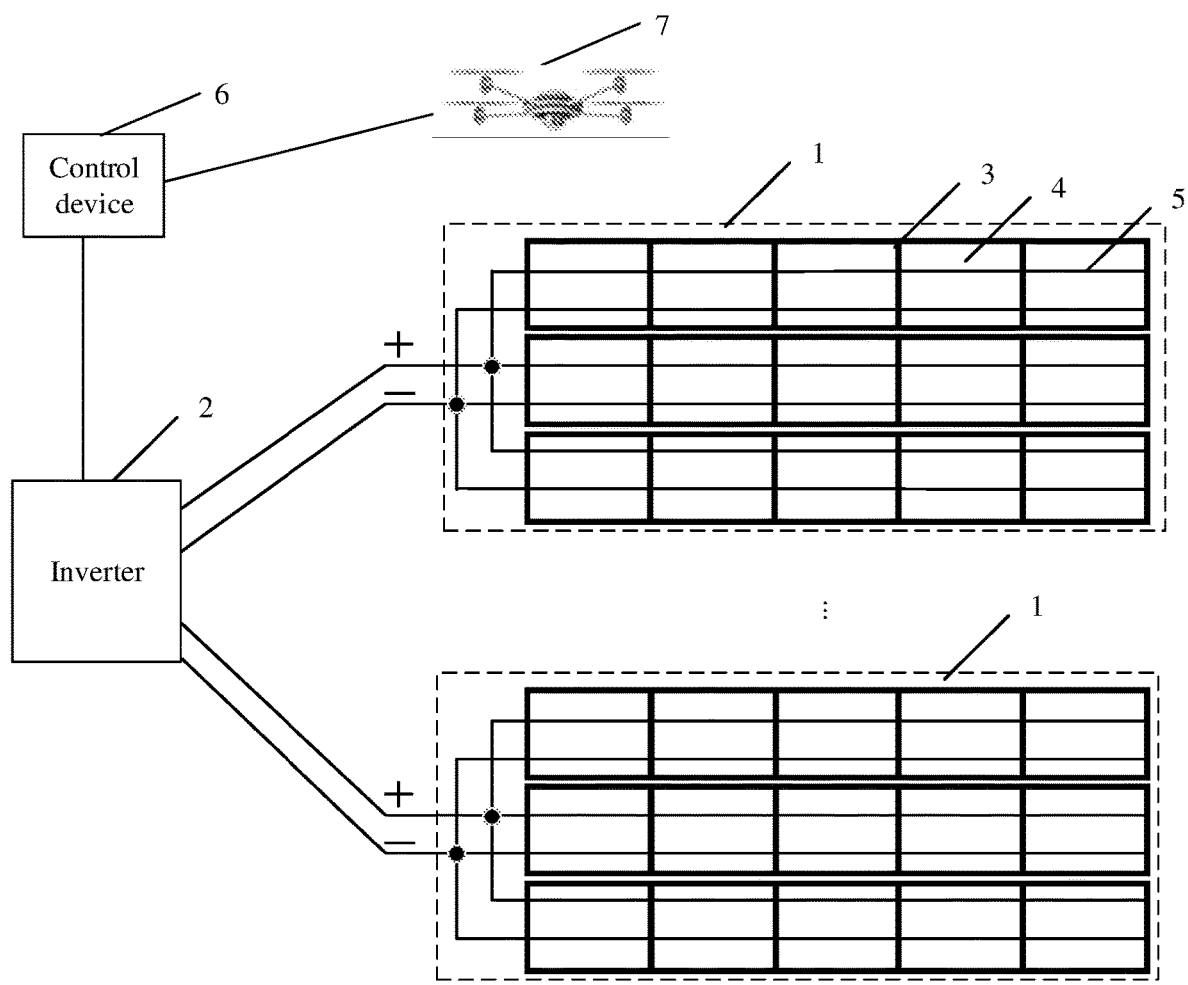
FIG. 2 is a schematic diagram of a structure of a detection system according to an embodiment.

Referring to FIG. 2, to detect whether a solar cell 4 has a defect, an embodiment provides a detection system. In addition to the foregoing inverter 2, the detection system includes a control device 6 and an infrared signal collection terminal 7.

The control device 6 may establish a network connection to the inverter 2 and establish a network connection to the infrared signal collection terminal 7.

The control device 6 may control, by using the inverter 2, a to-be-detected solar cell to operate in a short-circuit state. The to-be-detected solar cell reflects an ambient infrared signal when operating in the short-circuit state. The control device 6 controls the infrared signal collection terminal 7 to photograph the to-be-detected solar cell to obtain a first infrared image. The first infrared image includes infrared image information corresponding to the ambient infrared signal reflected by the to-be-detected solar cell.

The control device 6 may control, by using the inverter 2, the to-be-detected solar cell to operate in a first state. The first state may be an open-circuit state or an output state. The to-be-detected solar cell emits an infrared signal and reflects an ambient infrared signal when operating in the first state. The control device 6 controls the infrared signal collection terminal 7 to photograph the to-be-detected solar cell to obtain a second infrared image. The second infrared image includes infrared image information corresponding to the infrared signal emitted by and infrared image information corresponding to the ambient infrared signal reflected by the to-be-detected solar cell.

Optionally, the control device 6 may alternatively first control, by using the inverter 2, the to-be-detected solar cell to operate in the first state, and obtain the second infrared image by using the infrared signal collection terminal 7, and then control, by using the inverter 2, the to-be-detected solar cell to operate in the short-circuit state, and obtain the first infrared image by using the infrared signal collection terminal 7.

After obtaining the first infrared image and the second infrared image, the control device 6 detects, based on the first infrared image and the second infrared image, whether the to-be-detected solar cell has a defect.

For a detailed process in which the control device 6 controls, by using the inverter 2, the to-be-detected solar cell to operate in the short-circuit state or the first state, a detailed process in which the control device obtains the first infrared image or the second infrared image by using the infrared signal collection terminal 7, and a detailed process in which the control device detects the to-be-detected solar cell, refer to related content in the following embodiment shown in FIG. 3. Details are not described herein.

Optionally, the control device 6 may be a computer, a control center of a photovoltaic plant, or the like. The infrared signal collection terminal 7 may be an aerial photographing device with an infrared camera installed, for example, may be an unmanned aerial vehicle with an infrared camera installed.

Figure 3:
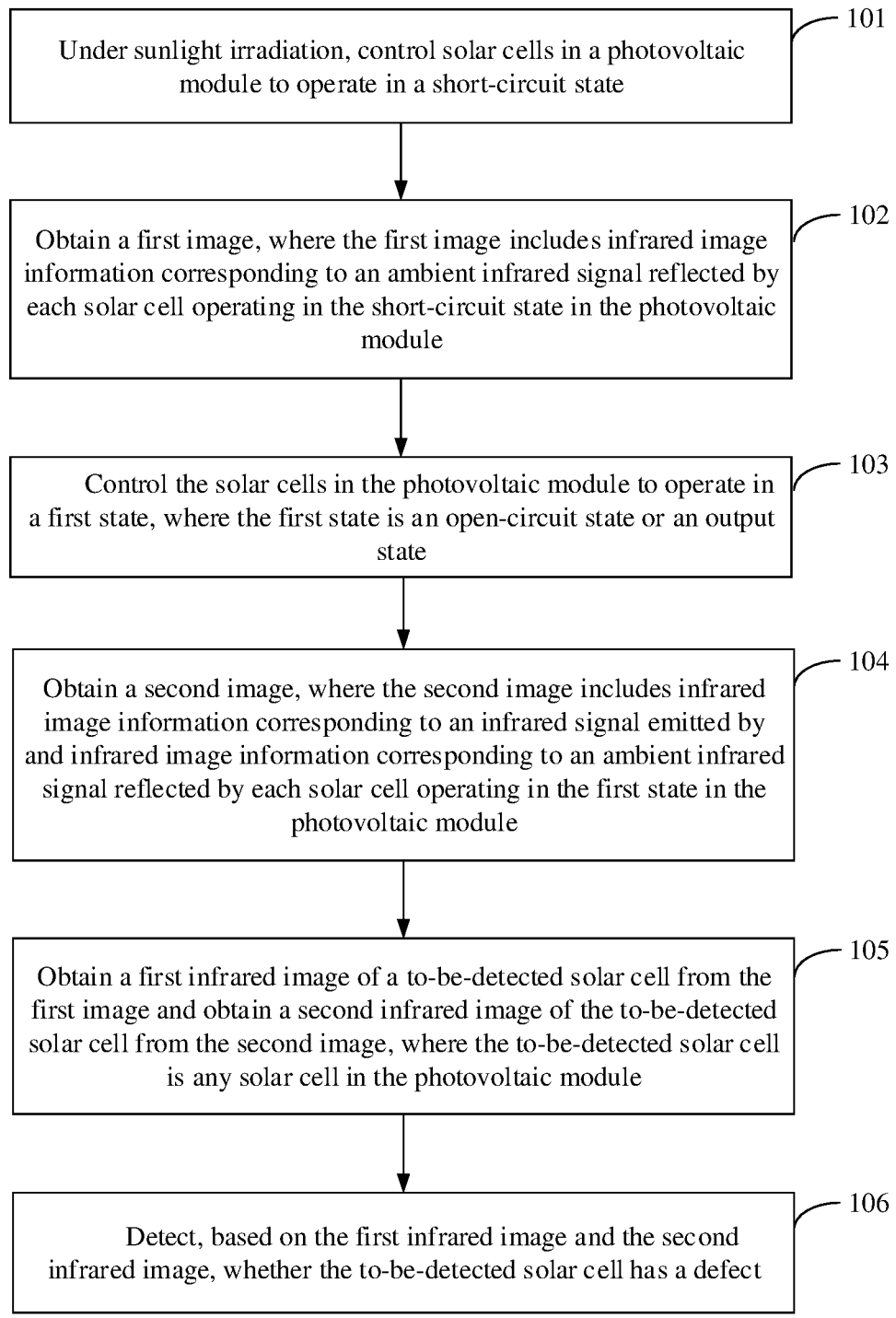
FIG. 3 is a flowchart of a method for detecting a solar cell of a photovoltaic plant according to an embodiment.

Referring to FIG. 3, an embodiment provides a method for detecting a solar cell of a photovoltaic plant. The method may be applied to the system architecture shown in FIG. 2. The method may be performed by the control device in the system architecture and includes the following steps.

Step 101: Under sunlight illumination, control solar cells in a photovoltaic module to operate in a short-circuit state.

When operation and maintenance personnel of the photovoltaic plant find that one or more photovoltaic modules of a photovoltaic plant have a problem, the operation and maintenance personnel need to detect solar cells in the photovoltaic module. In this case, the operation and maintenance personnel may input identification information of the one or more photovoltaic modules to the control device. Alternatively, when the operation and maintenance personnel of the photovoltaic plant need to perform comprehensive detection on the photovoltaic plant, the operation and maintenance personnel of the photovoltaic plant may input identification information of photovoltaic modules in the photovoltaic plant to the control device in a plurality of times and may input identification information of one or more photovoltaic modules each time. The comprehensive detection on the photovoltaic plant is detection on each solar cell in the photovoltaic plant.

The control device may obtain the input identification information of the photovoltaic module, and control, based on the identification information of the photovoltaic module, the photovoltaic module to operate in the short-circuit state. When the photovoltaic module operates in the short-circuit state, each solar cell in the photovoltaic module also operates in the short-circuit state.

The control device stores a module list. The module list is used to store a correspondence between identification information and basic information of a photovoltaic module, and each record in the module list includes identification information of a photovoltaic module in the photovoltaic plant and basic information of the photovoltaic module. The basic information of the photovoltaic module includes a location of the photovoltaic module, identification information of an inverter connected to the photovoltaic module, and the like.

After obtaining the identification information of the photovoltaic module, the control device may obtain basic information of the photovoltaic module from the module list based on the identification information of the photovoltaic module. Based on identification information, included in the basic information, of an inverter connected to the photovoltaic module, the control device establishes a network connection to the inverter, and sends a first control command to the inverter through the network connection. The first control command includes a first instruction. The inverter receives the first control command and implements a short circuit between a positive output end and a negative output end of the photovoltaic module according to the first instruction included in the first control command, so that the solar cell in the photovoltaic module operates in the short-circuit state.

The solar cell in the photovoltaic module does not emit an infrared signal when operating in the short-circuit state, but the solar cell in the photovoltaic module may reflect an ambient infrared signal.

Before performing this step, the control device may detect an illumination intensity of sunlight. When the illumination intensity of the sunlight exceeds a preset intensity threshold, the control device starts to perform this step, that is, starts to detect the solar cell in the photovoltaic plant.

The preset intensity threshold may be an illumination intensity of 200 watts per square meter, an illumination intensity of 220 watts per square meter, an illumination intensity of 240 watts per square meter, or the like.

The control device may include a sensor for detecting an illumination intensity and detect the illumination intensity of the sunlight by using the sensor. Alternatively, the control device may position the control device to obtain a location of the control device and obtain an illumination intensity of sunlight at the location from a network through query.

Step 102: Obtain a first image, where the first image includes infrared image information corresponding to an ambient infrared signal reflected by each solar cell operating in the short-circuit state in the photovoltaic module.

In this step, the control device may control the infrared signal collection terminal to move above the photovoltaic module, and when controlling the photovoltaic module to operate in the short-circuit state, the control device may control the infrared signal collection terminal to photograph the photovoltaic module and obtain a first image obtained by the infrared signal collection terminal through photographing.

There is a network connection between the control device and the infrared signal collection terminal, and the network connection may be established when the control device starts to detect the solar cell in the photovoltaic plant. Before the infrared signal collection terminal is controlled to photograph the photovoltaic module, when the basic information of the photovoltaic module is obtained, the control device sends a second control command to the infrared signal collection terminal through the network connection. The second control command includes the location of the photovoltaic module. The infrared signal collection terminal receives the second control command, moves above the photovoltaic module based on the location of the photovoltaic module included in the second control command, and adjusts a photographing parameter of the infrared signal collection terminal based on the location of the photovoltaic module, to photograph the photovoltaic module. The photographing parameter may include parameters such as a photographing angle and a focal length. After the photographing parameter is adjusted, a preparation completion message is sent to the control device through the network connection.

When the basic information of the photovoltaic module is obtained, the control device may first send the first control command to the inverter connected to the photovoltaic module, to control the photovoltaic module to operate in the short-circuit state, and then send the second control command to the infrared signal collection terminal. In this way, when the preparation completion message sent by the infrared signal collection terminal is received, the infrared signal collection terminal may be controlled to photograph the photovoltaic module.

Alternatively, the second control command may be first sent to the infrared signal collection terminal, and when the preparation completion message sent by the infrared signal collection terminal is received, the first control command is then sent to the inverter connected to the photovoltaic module, to control the photovoltaic module to operate in the short-circuit state. Then, the infrared signal collection terminal is controlled to photograph the photovoltaic module.

The operation of controlling, by the control device, the infrared signal collection terminal to photograph the photovoltaic module may be as follows:

The control device may send a photographing command to the infrared signal collection terminal through the network connection to the infrared signal collection terminal. The infrared signal collection terminal receives the photographing command, photographs the photovoltaic module to obtain a first image, and sends the first image to the control device through the network connection. The control device receives the first image.

The control device may store, in an image list, a correspondence between the identification information of the photovoltaic module, the short-circuit state, and the first image.

A process of obtaining the first image through photographing by the infrared signal collection terminal is essentially collecting an infrared signal and forming the first image based on the collected infrared signal. The infrared signal collected by the infrared signal collection terminal includes an ambient infrared signal reflected by each solar cell in the photovoltaic module. Therefore, the first image includes infrared image information corresponding to the ambient infrared signal reflected by each solar cell in the photovoltaic module.

The first image includes an infrared image of the photovoltaic module, and the infrared image of the photovoltaic module includes an infrared image of each solar cell in the photovoltaic module. In addition to the infrared image of the photovoltaic module, the first image may include an infrared image of another photovoltaic module or an object image. Because the photographing parameter of the infrared signal collection terminal is adjusted based on the location of the photovoltaic module, the infrared image of the photovoltaic module may be marked by the infrared signal collection terminal in the first image obtained through photographing.

Step 103: Control the solar cells in the photovoltaic module to operate in a first state, where the first state is an open-circuit state or an output state.

When the first state is the open-circuit state, the control device sends a first control command to the inverter connected to the photovoltaic module. The first control command includes a second instruction. The inverter receives the first control command and disconnects from the positive and negative output ends of the photovoltaic module according to the second instruction included in the first control command, so that the solar cell in the photovoltaic module operates in the open-circuit state.

Alternatively, when the first state is the output state, the control device determines a target output power greater than a preset threshold and sends a first control command to the inverter connected to the photovoltaic module. The first control command includes the target output power. The inverter receives the first control command and controls an output power of the photovoltaic module to be equal to the target output power included in the first control command, so that the solar cell in the photovoltaic module operates in the output state.

When the photovoltaic module operates in the output state or the open-circuit state, the solar cell in the photovoltaic module converts illuminating sunlight into electrical energy and emits an infrared signal based on the electrical energy.

A strength of the infrared signal emitted by the solar cell in the photovoltaic module when the solar cell in the photovoltaic module operates in the output state is less than a strength of the infrared signal emitted by the solar cell in the photovoltaic module when the solar cell in the photovoltaic module operates in the open-circuit state.

Optionally, a time difference between a start time of the first state and a start time of the short-circuit state does not exceed a preset time threshold, so that it is ensured that a strength of the ambient infrared signal when the solar cell in the photovoltaic module operates in the short-circuit state is basically the same as a strength of an ambient infrared signal when the solar cell in the photovoltaic module operates in the first state.

Step 104: Obtain a second image, where the second image includes infrared image information corresponding to an infrared signal emitted by and infrared image information corresponding to an ambient infrared signal reflected by each solar cell operating in the first state in the photovoltaic module.

In this step, the control device may send a photographing command to the infrared signal collection terminal through the network connection to the infrared signal collection terminal. The infrared signal collection terminal receives the photographing command, photographs the photovoltaic module to obtain a second image, and sends the second image to the control device through the network connection. The control device receives the second image.

Optionally, the control device may store, in the image list, a correspondence between the identification information of the photovoltaic module, the first state, and the second image.

A process of obtaining the second image through photographing by the infrared signal collection terminal is essentially collecting an infrared signal and forming the second image based on the collected infrared signal. The infrared signal collected by the infrared signal collection terminal includes an infrared signal emitted by and an ambient infrared signal reflected by each solar cell in the photovoltaic module. Therefore, the second image includes infrared image information corresponding to the infrared signal emitted by and infrared image information corresponding to the ambient infrared signal reflected by each solar cell in the photovoltaic module.

The second image includes an infrared image of the photovoltaic module, and the infrared image of the photovoltaic module includes an infrared image of each solar cell in the photovoltaic module. In addition to the infrared image of the photovoltaic module, the second image may include an infrared image of another photovoltaic module or an object image. The infrared image of the photovoltaic module may be marked by the infrared signal collection terminal in the second image obtained through photographing.

After adjusting the photographing parameter based on the photovoltaic module, the infrared signal collection terminal does not adjust the photographing parameter. Therefore, the infrared signal collection terminal obtains the first image and the second image through photographing based on the photographing parameter, and each pixel in the first image corresponds to one pixel in the second image. For a pixel in the first image and a pixel that is in the second image and that corresponds to the pixel, the two pixels correspond to a same physical point in physical space. In addition, a location of the pixel that is in the first image and that corresponds to the physical point is the same as a location of the pixel that is in the second image and that corresponds to the physical point. For example, assuming that the physical point corresponds to a pixel in an $i^{th}$ row and a $j^{th}$ column in the first image, the physical point also corresponds to a pixel in an $i^{th}$ row and a $j^{th}$ column in the second image.

Optionally, the control device may first perform steps 101 and 102, and then perform steps 103 and 104. That is, the control device may first control the solar cells in the photovoltaic module to operate in the short-circuit state and control the infrared signal collection terminal to obtain the first image through photographing, and then control the solar cells in the photovoltaic module to operate in the first state and control the infrared signal collection terminal to obtain the second image through photographing.

Alternatively, the control device may first perform steps 103 and 104, and then perform steps 101 and 102. That is, the control device may first control the solar cells in the photovoltaic module to operate in the first state and control the infrared signal collection terminal to obtain the second image through photographing, and then control the solar cells in the photovoltaic module to operate in the short-circuit state and control the infrared signal collection terminal to obtain the first image through photographing.

The first state may be the open-circuit state or the output state. The control device may control the solar cells in the photovoltaic module to operate in either of the two first states or may control the photovoltaic module to operate in the open-circuit state and the output state separately. That is, the control device may control the solar cells in the photovoltaic module to operate in the open-circuit state or operate in the output state and control the infrared signal collection terminal to obtain a second image through photographing. Alternatively, the control device may control the solar cells in the photovoltaic module to operate in the open-circuit state and control the infrared signal collection terminal to obtain a second image through photographing, and then control the solar cells in the photovoltaic module to operate in the output state and control the infrared signal collection terminal to obtain a second image through photographing. Alternatively, the control device may control the solar cells in the photovoltaic module to operate in the output state and control the infrared signal collection terminal to obtain a second image through photographing, and then control the solar cells in the photovoltaic module to operate in the open-circuit state and control the infrared signal collection terminal to obtain a second image through photographing.

When all solar cells in the photovoltaic plant are detected, after the control device obtains an image of the photovoltaic module operating in each operation state, the control device may prompt the operation and maintenance personnel to input identification information of another photovoltaic module in the photovoltaic plant. Then, the control device repeats the foregoing steps 101 to 104, to obtain an image of the another photovoltaic module operating in each operation state, and correspondingly stores, in the image list, the identification information of the another photovoltaic module, the operation state, and the image obtained in the operation state. After the operation and maintenance personnel input identification information of all photovoltaic modules, the following steps 105 and 106 of detecting a solar cell based on the image list may be performed.

Alternatively, after obtaining the image of the photovoltaic module operating in each operation state, the control device may directly perform the following steps 105 and 106 to detect the solar cells in the photovoltaic module. In this case, after detecting the solar cells in the photovoltaic module, the control device prompts the operation and maintenance personnel to input identification information of another photovoltaic module in the photovoltaic plant and starts from the foregoing step 101.

After controlling the photovoltaic module to operate in the short-circuit state or the open-circuit state, the control device immediately controls the infrared signal collection terminal to photograph the solar cells in the photovoltaic module. After the photographing is completed, the control device controls the solar cells in the photovoltaic module to operate in the output state. When operating in the output state, the photovoltaic module outputs electrical energy to a mains power grid by using the inverter. Therefore, the photovoltaic module operates in the short-circuit state or the open-circuit state for a relatively short period of time, to reduce power generation loss of the photovoltaic module as far as possible.

Step 105: Obtain a first infrared image of a to-be-detected solar cell from the first image and obtain a second infrared image of the to-be-detected solar cell from the second image, where the to-be-detected solar cell is any solar cell in the photovoltaic module.

Optionally, when the image list is stored, a first image and a second image that correspond to identification information of a same photovoltaic module may be obtained from the image list, and then this step starts to be performed.

The first image includes an infrared image of an identified photovoltaic module, and the infrared image of the photovoltaic module includes an infrared image of each solar cell in the photovoltaic module. The second image includes an infrared image of an identified photovoltaic module, and the infrared image of the photovoltaic module includes an infrared image of each solar cell in the photovoltaic module.

For a same solar cell, an infrared image location of the solar cell in the first image is the same as an infrared image location of the solar cell in the second image.

Therefore, the infrared image of each solar cell in the photovoltaic module can be extracted from the first image, and the infrared image of each solar cell in the photovoltaic module can be recognized from the second image. For any solar cell in the photovoltaic module, for ease of description, the solar cell is referred to as a to-be-detected solar cell. An infrared image of the to-be-detected solar cell is extracted from the first image, to obtain a first infrared image. The first infrared image includes infrared image information corresponding to an ambient infrared signal reflected by the to-be-detected solar cell operating in the short-circuit state. An infrared image of the to-be-detected solar cell is extracted from the second image, to obtain a second infrared image. The second infrared image includes infrared image information corresponding to an infrared signal emitted by and infrared image information corresponding to an ambient infrared signal reflected by the to-be-detected solar cell operating in the first state.

Step 106: Detect, based on the first infrared image and the second infrared image, whether the to-be-detected solar cell has a defect.

This step may be implemented by performing the following operations of 1061 and 1062. The operations of 1061 and 1062 are respectively as follows:

1061: Remove, based on the first infrared image, the infrared image information that is included in the second infrared image and that corresponds to the ambient infrared signal, to obtain a third infrared image.

In this step, a pixel that is in the first infrared image and that corresponds to a target pixel is determined. The target pixel is any pixel in the second infrared image. Brightness information of the determined pixel is subtracted from brightness information of the target pixel. The foregoing operations on the target pixel are repeated for each other pixel in the second infrared image, to obtain the third infrared image.

1062: Detect, based on the third infrared image and a defect library, whether the to-be-detected solar cell has a defect, where the defect library includes at least one defect and at least one sample image corresponding to each defect.

For each defect in the defect library, each sample image corresponding to the defect is a solar cell image with the defect. At least one solar cell image with the defect may be collected in advance as a sample image, and a correspondence between the defect and the sample image is stored in the defect library.

For each defect in the defect library, when it is detected whether the to-be-detected solar cell has the defect, at least one sample image corresponding to the defect may be obtained from the defect library. A similarity between the third infrared image and each sample image corresponding to the defect is obtained. When a similarity between the third infrared image and a sample image exceeds a preset similarity threshold, it is determined that the to-be-detected solar cell has the defect. When the similarity between the third infrared image and each sample image does not exceed the preset similarity threshold, it is determined that the to-be-detected solar cell does not have the defect.

For each defect in the defect library, the to-be-detected solar cell may be detected by using a third infrared image in either first state. However, for a partial defect in the defect library, a first state corresponding to the defect is stored in the defect library, and whether the to-be-detected solar cell has the defect is detected by using a third infrared image in the first state corresponding to the defect, so that accuracy of detecting whether the to-be-detected solar cell has the defect can be improved.

For example, when a hidden crack defect is detected, a higher brightness of each pixel in a third infrared image indicates higher accuracy of detecting the hidden crack defect. In the open-circuit state, the solar cell in the photovoltaic module emits a strongest infrared signal, so that a brightness of each pixel in a third infrared image in the open-circuit state is the highest. Therefore, the first state corresponding to the hidden crack defect is stored in the defect library as the open-circuit state.

When it is detected whether the to-be-detected solar cell has a defect, it is determined whether the defect library has a first state corresponding to the defect. If yes, when steps 103 and 104 are performed, the solar cells in the photovoltaic module are controlled to operate in the first state corresponding to the defect, and a second image is obtained through photographing in the first state. In step 105, the corresponding second image may be obtained from the image list based on the identification information of the photovoltaic module and the first state. A second infrared image of the to-be-detected solar cell is obtained from the second image, and infrared image information that is in the second infrared image and that corresponds to an ambient infrared signal is eliminated by using the first infrared image, to obtain a third infrared image. Whether the to-be-detected solar cell has the defect is detected based on the third infrared image and at least one sample image corresponding to the defect in the defect library.

The process of steps 105 and 106 is repeated to detect whether another solar cell in the photovoltaic module has a defect. After the photovoltaic module is detected, another photovoltaic module is detected, to implement comprehensive detection on the solar cells in the photovoltaic plant.

Optionally, when it is detected that the to-be-detected solar cell does not have a defect, because the to-be-detected solar cell has been used for a long time, although the to-be-detected solar cell does not have a defect, power attenuation may occur on the to-be-detected solar cell due to reasons such as aging. In this step, a power attenuation degree of the to-be-detected solar cell may be predicted based on the third infrared image corresponding to the to-be-detected solar cell.

Optionally, a prediction process is as follows: A corresponding reference luminance is obtained based on an illumination intensity of current sunlight from a preset correspondence between an illumination intensity range and a reference luminance. A light emission luminance of the to-be-detected solar cell is determined based on brightness information included in the third infrared image corresponding to the to-be-detected solar cell. The light emission luminance is equal to a strength of the infrared signal emitted by the to-be-detected solar cell. A luminance difference between the reference luminance and the light emission luminance is obtained, and a percentage of the luminance difference to the reference luminance is obtained. The percentage is the power attenuation degree of the to-be-detected solar cell.

In this step, for a photovoltaic module that has been detected, a quantity of solar cells corresponding to each defect and a quantity of normal solar cells in the photovoltaic module may be counted, and a health index of the photovoltaic module may be determined based on the quantity of solar cells corresponding to each defect, a weight corresponding to each defect, the quantity of normal solar cells, a weight corresponding to the normal solar cell, and a total quantity of solar cells in the photovoltaic module.

During an implementation, a percentage of solar cells corresponding to each defect is calculated based on the quantity of solar cells corresponding to each defect in the photovoltaic module and the total quantity of solar cells in the photovoltaic module. A percentage of normal solar cells is calculated based on the quantity of normal solar cells in the photovoltaic module and the total quantity of solar cells in the photovoltaic module. The health index of the photovoltaic module is determined based on the percentage of solar cells corresponding to each defect and the percentage of normal solar cells by using the following first formula. The health index may be used to provide reference for the operation and maintenance personnel to make a processing decision on the photovoltaic module.

The first formula is $Q=P*a+P_1*a_1+P_2*a_2+\ldots+P_k*a_k$.

In the first formula, Q is the health index of the photovoltaic module, P is the percentage of normal solar cells, a is the weight corresponding to the normal solar cell, $P_1$ is a percentage of solar cells corresponding to a first defect, $a_1$ is a weight corresponding to the first defect, $P_2$ is a percentage of solar cells corresponding to a second defect, $a_2$ is a weight corresponding to the second defect, $P_k$ is a percentage of solar cells corresponding to a $k^{th}$ defect, $a_k$ is a weight corresponding to the $k^{th}$ defect, k is an integer greater than or equal to 1, and * is a multiplication operation.

Figure 4:
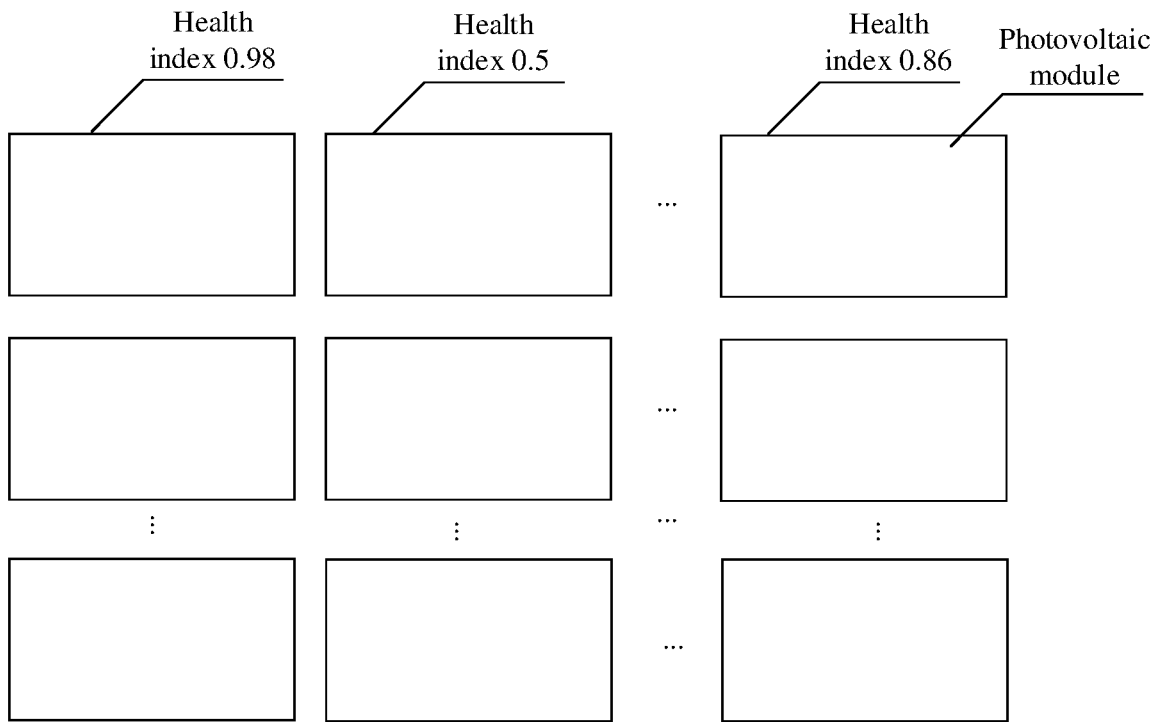
FIG. 4 is a schematic diagram of a panoramic image of a photovoltaic plant according to an embodiment.

Optionally, referring to FIG. 4, the control device may include a panoramic image of the photovoltaic plant, obtain the location of the photovoltaic module from the module list based on the identification information of the photovoltaic module, determine an image of the photovoltaic module in the panoramic image based on the location of the photovoltaic module, and display mark information in the image of the photovoltaic module. The mark information is used to mark a defective solar cell in the photovoltaic module.

The mark information may include preset indication information used to indicate that the photovoltaic module has a defective solar cell, and at least one of the health index of the photovoltaic module, each defect in the photovoltaic module, the quantity of solar cells corresponding to each defect in the photovoltaic module, the percentage of solar cells corresponding to each defect in the photovoltaic module, or the like.

In this embodiment, under sunlight illumination, a to-be-detected solar cell in a to-be-detected photovoltaic module is controlled to operate in a plurality of different operation states, to obtain a first infrared image and a second infrared image of the to-be-detected solar cell. The first infrared image is an infrared image obtained through photographing when the to-be-detected solar cell operates in a short-circuit state and includes infrared image information corresponding to an ambient infrared signal reflected by the to-be-detected solar cell. The second infrared image is an infrared image obtained through photographing when the to-be-detected solar cell operates in a first state and includes infrared image information corresponding to an infrared signal emitted by and infrared image information corresponding to an ambient infrared signal reflected by the to-be-detected solar cell. Then the infrared image information corresponding to the infrared signal in the second infrared image is removed based on the first infrared image to obtain a third infrared image. Because ambient noise is eliminated in the third infrared image, so that whether the to-be-detected solar cell has a defect may be detected by using the third infrared image, when a sunlight source is used, the to-be-detected solar cell may be detected based on the first infrared image and the second infrared image. In this way, it is unnecessary to use an artificial light source to detect the photovoltaic module indoors, thereby reducing difficulty and operation and maintenance costs of photovoltaic module detection, and comprehensively detecting solar cells in the photovoltaic plant. In addition, mark information may be displayed on a photovoltaic module image with a defective solar cell in the panoramic image of the photovoltaic plant, so that the maintenance personnel may view a defective photovoltaic module in the photovoltaic plant. For the defective photovoltaic module, a health index of the photovoltaic module is obtained, so that the maintenance personnel may make a processing decision on the photovoltaic module based on the health index.

The following are apparatus embodiments, which may be used for performing the method embodiments. For details that are not disclosed in the apparatus embodiments, refer to the method embodiments.

Figure 5:
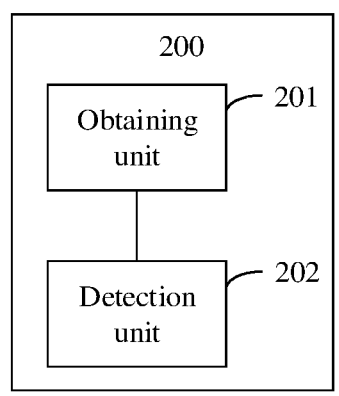
FIG. 5 is a schematic diagram of a structure of an apparatus for detecting a solar cell of a photovoltaic plant according to an embodiment.

Referring to FIG. 5, an embodiment may provide an apparatus 200 for detecting a solar cell of a photovoltaic plant. The apparatus 200 is deployed in the control device in any one of the foregoing embodiments and includes:

an obtaining unit 201, configured to obtain a first infrared image and a second infrared image, where the first infrared image includes infrared image information corresponding to an ambient infrared signal reflected by a to-be-detected solar cell operating in a short-circuit state, the second infrared image includes infrared image information corresponding to an infrared signal emitted by the to-be-detected solar cell operating in a first state and infrared image information corresponding to an ambient infrared signal reflected by the to-be-detected solar cell, and the first state is another state other than the short-circuit state; and a detection unit 202, configured to detect, based on the first infrared image and the second infrared image, whether the to-be-detected solar cell has a defect.

Optionally, the detection unit 202 is configured to:

remove, based on the first infrared image, the infrared image information that is included in the second infrared image and that corresponds to the ambient infrared signal, to obtain a third infrared image; and detect, based on the third infrared image and a defect library, whether the to-be-detected solar cell has a defect, where the defect library includes at least one defect and at least one sample image corresponding to each defect.

Figure 6:
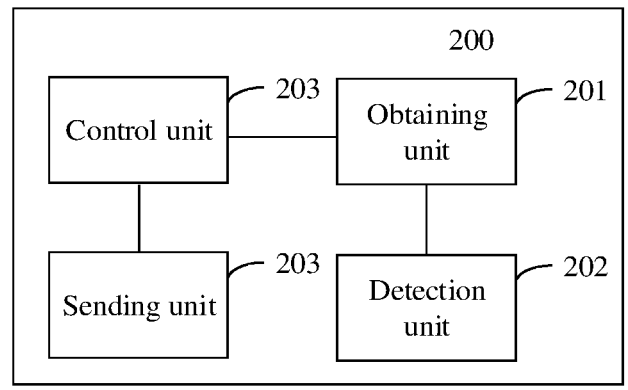
FIG. 6 is a schematic diagram of a structure of another apparatus for detecting a solar cell of a photovoltaic plant according to an embodiment.

Referring to FIG. 6, optionally, the apparatus 200 includes:

a control unit 203, configured to control the to-be-detected solar cell to operate in the short-circuit state and the first state separately.

Optionally, the defect library includes a first state corresponding to a target defect, and the target defect is a partial defect in the defect library.

The control unit 203 is configured to control the to-be-detected solar cell to operate in the first state corresponding to the target defect.

The detection unit 202 is configured to detect, based on the first infrared image and the second infrared image, whether the to-be-detected solar cell has the target defect.

Optionally, positive and negative output ends of a photovoltaic module on which the to-be-detected solar cell is located are connected to an inverter.

Referring to FIG. 6, the apparatus 200 includes:

a sending unit 204, configured to send a control command to the inverter, where the control command carries a first instruction, and the first instruction is used to instruct the inverter to implement a short circuit between the positive output end and the negative output end of the photovoltaic module, so that the to-be-detected solar cell operates in the short-circuit state.

Optionally, when determining to control the to-be-detected solar cell to operate in the short-circuit state, the control unit 203 triggers the sending unit 204, and then the sending unit 204 sends, to the inverter, the control command carrying the first instruction.

Optionally, the first state includes at least one of an open-circuit state or an output state.

The sending unit 204 is configured to:

send a control command to the inverter, where the control command carries a second instruction, and the second instruction is used to instruct the inverter to disconnect from the positive output end and the negative output end of the photovoltaic module, so that the to-be-detected solar cell operates in the open-circuit state; or send a control command to the inverter, where the control command carries a target output power, and the target output power exceeds a preset threshold, so that the inverter controls an output power of the photovoltaic module to be equal to the target output power, so that the to-be-detected solar cell operates in the output state.

Optionally, when determining to control the to-be-detected solar cell to operate in the open-circuit state, the control unit 203 triggers the sending unit 204, and then the sending unit 204 sends, to the inverter, the control command carrying the second instruction. Alternatively, when determining to control the to-be-detected solar cell to operate in the output state, the control unit 203 triggers the sending unit 204, and then the sending unit 204 sends, to the inverter, the control command carrying the third instruction.

Optionally, the obtaining unit 201 is configured to:

count a quantity of solar cells corresponding to each defect and a quantity of normal solar cells in the photovoltaic module and obtain a health index of the photovoltaic module based on the quantity of solar cells corresponding to each defect, a weight corresponding to each defect, the quantity of normal solar cells, a weight corresponding to the normal solar cell, and a total quantity of solar cells in the photovoltaic module.

Optionally, the control unit 203 is configured to:

control, when an illumination intensity of sunlight exceeds a preset intensity threshold, the to-be-detected solar cell to operate in the short-circuit state and the first state separately.

Optionally, a time difference between a start time of the short-circuit state and a start time of the first state does not exceed a preset time threshold.

In this embodiment, the obtaining unit obtains the first infrared image and the second infrared image, the first infrared image includes the infrared image information corresponding to the ambient infrared signal reflected by the to-be-detected solar cell operating in the short-circuit state, the second infrared image includes the infrared image information corresponding to the infrared signal emitted by the to-be-detected solar cell operating in the first state and the infrared image information corresponding to the ambient infrared signal reflected by the to-be-detected solar cell, and the first state is another state other than the short-circuit state. Therefore, the detection unit may detect, based on the first infrared image and the second infrared image, whether the to-be-detected solar cell has a defect. When a sunlight source is used, the solar cell may be detected based on the first infrared image and the second infrared image In this way, it is unnecessary to use an artificial light source to detect a photovoltaic module indoors, thereby reducing difficulty and operation and maintenance costs of photovoltaic module detection.

Figure 7:
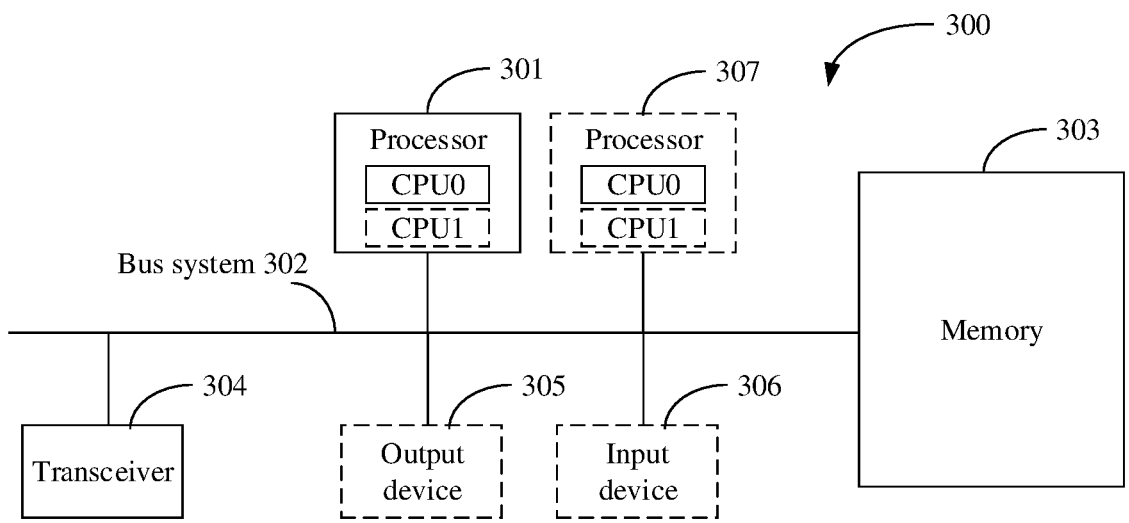
FIG. 7 is a schematic diagram of a structure of another apparatus for detecting a solar cell of a photovoltaic plant according to an embodiment.

FIG. 7 is a schematic diagram of another apparatus 300 for detecting a solar cell of a photovoltaic plant according to an embodiment. The apparatus 300 includes at least one processor 301, a bus system 302, a memory 303, and at least one transceiver 304.

The apparatus 300 may be a hardware structure and may be configured to implement function modules in the apparatus 200 in FIG. 5 or FIG. 6. For example, a person skilled in the art may perceive that the obtaining unit 201 and the detection unit 202 in the apparatus 200 shown in FIG. 5 or FIG. 6 may be implemented by invoking code in the memory 303 by using the at least one processor 301. The control unit 203 in the apparatus 200 shown in FIG. 6 may be implemented by using the at least one processor 301 and the transceiver 304. The sending unit 204 in the apparatus 200 shown in FIG. 6 may be implemented by using the transceiver 304.

Optionally, the apparatus 300 may be configured to implement a function of the transmit end according to any one of the foregoing embodiments.

Optionally, the processor 301 may be a general-purpose central processing unit (CPU), a microprocessor, an application-specific integrated circuit (ASIC), or one or more integrated circuits for controlling program execution of the solutions of the embodiments.

The bus system 302 may include a path to transmit information between the foregoing components.

The transceiver 304 is configured to communicate with another device or a communications network.

The memory 303 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium capable of including or storing expected program code in a form of an instruction or a data structure and capable of being accessed by a computer. However, the memory 303 is not limited thereto. The memory 303 may exist independently and may be connected to the processor 301 through the bus system 302. The memory 303 may alternatively be integrated with the processor 301.

The memory 303 is configured to store application program code for performing the solutions, and the processor 301 controls the performing. The processor 301 is configured to execute the application program code stored in the memory 303, to implement a function in the method in this patent.

During implementation, in an embodiment, the processor 301 may include one or more CPUs, for example, a CPU 0 and a CPU 1 in FIG. 7.

During implementation, in an embodiment, the apparatus 300 may include a plurality of processors, for example, a processor 301 and a processor 307 in FIG. 7. Each of the processors may be a single-core (single-CPU) processor or may be a multi-core (multi-CPU) processor. The processor herein may be one or more devices, circuits, and/or processing cores configured to process data (for example, a computer program instruction).

During implementation, in an embodiment, the communications apparatus 700 may include an output device 305 and an input device 306. The output device 305 communicates with the processor 301 and may display information in a plurality of manners. For example, the output device 305 may be a liquid crystal display (LCD), or the like. The input device 306 communicates with the processor 301 and may receive input of a user in a plurality of manners. For example, the input device 306 may be a touchscreen device, or a sensor device.

The foregoing descriptions are merely example embodiments, but are not intended as limiting. Any modification, equivalent replacement, or improvement made without departing from the principle of the embodiments should fall within the scope of the embodiments.

What is claimed is:

1. A method for detecting a solar cell of a photovoltaic plant, the method comprising:
   obtaining a first infrared image and a second infrared image, wherein the first infrared image comprises infrared image information corresponding to an ambient infrared signal reflected by a to-be-detected solar cell operating in a short-circuit state, the second infrared image comprises infrared image information corresponding to an infrared signal emitted by the to-be-detected solar cell operating in a first state and infrared image information corresponding to an ambient infrared signal reflected by the to-be-detected solar cell, and the first state is another state other than the short-circuit state;
   obtaining a third infrared image by subtracting brightness information of pixels in the first infrared image from brightness information of pixels in the second infrared image;
   comparing the third infrared image with sample images stored in a defect library, wherein each sample image corresponds to a respective defect; and
   detecting a defect after the comparison results in a similarity of the third infrared image to a sample image with a particular defect that exceeds a preset similarity threshold.

2. The method according to claim 1, wherein
the defect library is configured to store a correspondence between a plurality of defects in solar cells and at least one of the sample images.

3. The method according to claim 1, wherein before the obtaining of the first infrared image and the second infrared image, the method further comprises:
   controlling the to-be-detected solar cell to operate in either the short-circuit state or the first state.

4. The method according to claim 3, wherein positive and negative output ends of a photovoltaic module on which the to-be-detected solar cell is located are connected to an inverter; and
   the controlling of the to-be-detected solar cell to operate in the short-circuit state further comprises:
   sending a control command to the inverter, wherein the control command carries a first instruction, and the first instruction is used to instruct the inverter to implement a short circuit between the positive output end and the negative output end of the photovoltaic module, so that the to-be-detected solar cell operates in the short-circuit state.

5. The method according to claim 4, wherein the first state comprises at least one of an open-circuit state or an output state, and
   the controlling of the to-be-detected solar cell to operate in the first state further comprises:
   sending a control command to the inverter, wherein the control command carries a second instruction, and the second instruction is used to instruct the inverter to disconnect from the positive output end and the negative output end of the photovoltaic module, so that the to-be-detected solar cell operates in the open-circuit state; or
   sending a control command to the inverter, wherein the control command carries a target output power, and the target output power exceeds a preset threshold, so that the inverter controls an output power of the photovoltaic module to be equal to the target output power, so that the to-be-detected solar cell operates in the output state.

6. The method according to claim 4, further comprising: counting a quantity of defective solar cells and a quantity of normal solar cells in the photovoltaic module, and obtaining a health index of the photovoltaic module based on the counted quantity of defective solar cells, the counted quantity of normal solar cells, and a total quantity of solar cells in the photovoltaic module.

7. The method according to claim 3, wherein the controlling of the to-be-detected solar cell to operate in the short-circuit state and the first state separately further comprises:
controlling, when an illumination intensity of sunlight exceeds a preset intensity threshold, the to-be-detected solar cell to operate in the short-circuit state and the first state separately.

8. The method according to claim 1, further comprising:
measuring a start time of the short-circuit state;
measuring a start time of the first state; and
keeping a difference between the start time of the short-circuit state and the start time of the first state below a preset time threshold.

9. An apparatus for detecting a solar cell of a photovoltaic plant, the apparatus comprising:
an obtaining unit configured to obtain a first infrared image and a second infrared image, wherein the first infrared image comprises infrared image information corresponding to an ambient infrared signal reflected by a to-be-detected solar cell operating in a short-circuit state, the second infrared image comprises infrared image information corresponding to an infrared signal emitted by the to-be-detected solar cell operating in a first state and infrared image information corresponding to an ambient infrared signal reflected by the to-be-detected solar cell, and the first state is another state other than the short-circuit state; and
a detection unit configured to:
obtain a third infrared image by subtracting brightness information of pixels in the first infrared image from brightness information of pixels in the second infrared image;
compare the third infrared image with sample images stored in a defect library, wherein each sample image corresponds to a respective defect; and
detect a defect after the comparison results in a similarity of the third infrared image to a sample image with a particular defect that exceeds a preset similarity threshold.

10. The apparatus according to claim 9, wherein
the defect library is configured to store a correspondence between a plurality of defects in solar cells and at least one of the sample images.

11. The apparatus according to claim 9, further comprising:
a control unit configured to control the to-be-detected solar cell to operate in either the short-circuit state or the first state.

12. The apparatus according to claim 11, wherein positive and negative output ends of a photovoltaic module on which the to-be-detected solar cell is located are connected to an inverter; and
the apparatus further comprises:
a sending unit configured to send a control command to the inverter, wherein the control command carries a first instruction, and the first instruction is used to instruct the inverter to implement a short circuit between the positive output end and the negative output end of the photovoltaic module, so that the to-be-detected solar cell operates in the short-circuit state.

13. The apparatus according to claim 12, wherein the first state comprises at least one of an open-circuit state or an output state, and
the sending unit is further configured to:
send a control command to the inverter, wherein the control command carries a second instruction, and the second instruction is used to instruct the inverter to disconnect from the positive output end and the negative output end of the photovoltaic module, so that the to-be-detected solar cell operates in the open-circuit state; or
send a control command to the inverter, wherein the control command carries a target output power, and the target output power exceeds a preset threshold, so that the inverter controls an output power of the photovoltaic module to be equal to the target output power, so that the to-be-detected solar cell operates in the output state.

14. The apparatus according to claim 12, wherein the obtaining unit is further configured to:
count a quantity of defective solar cells and a quantity of normal solar cells in the photovoltaic module, and
obtain a health index of the photovoltaic module based on the counted quantity of defective solar cells, the counted quantity of normal solar cells, and a total quantity of solar cells in the photovoltaic module.

15. The apparatus according to claim 11, wherein the control unit is further configured to:
control, when an illumination intensity of sunlight exceeds a preset intensity threshold, the to-be-detected solar cell to operate in the short-circuit state and the first state separately.

16. The apparatus according to claim 9, wherein the control unit is further configured to:
measure a start time of the short-circuit state; and
measure a start time of the first state; and
keeping a difference between the start time of the short-circuit state and the start time of the first state below a preset time threshold.

17. A system for detecting a solar cell of a photovoltaic plant, wherein the system comprises:
a control device;
an inverter; and
an infrared signal collection terminal, wherein the inverter is connected to a to-be-detected solar cell;
the control device is configured to obtain a first infrared image and a second infrared image by using the inverter and the infrared signal collection terminal, wherein the first infrared image comprises infrared image information corresponding to an ambient infrared signal reflected by the to-be-detected solar cell operating in a short-circuit state, the second infrared image comprises infrared image information corresponding to an infrared signal emitted by the to-be-detected solar cell operating in a first state and infrared image information corresponding to an ambient infrared signal reflected by the to-be-detected solar cell, and the first state is another state other than the short-circuit state, and the control device is configured to:
obtain a third infrared image by subtracting brightness information of pixels in the first infrared image from brightness information of pixels in the second infrared image;
compare the third infrared image with sample images stored in a defect library, wherein each sample image corresponds to a respective defect; and
detect a defect after the comparison results in a similarity of the third infrared image to a sample image with a particular defect that exceeds a preset similarity threshold.

* * * * *